United States Patent
Fujinaka

(10) Patent No.: US 10,162,196 B2
(45) Date of Patent: Dec. 25, 2018

(54) FUNCTIONAL LENS AND FUNCTIONAL EYEGLASSES PROVIDED WITH SAME

(71) Applicant: DAICEL-EVONIK LTD., Tokyo (JP)

(72) Inventor: Toshihiko Fujinaka, Himeji (JP)

(73) Assignee: DAICEL-EVONIK LTD., Tokyo (JP)

( * ) Notice: Subject to any disclaimer, the term of this patent is extended or adjusted under 35 U.S.C. 154(b) by 11 days.

(21) Appl. No.: 15/320,691

(22) PCT Filed: Mar. 24, 2016

(86) PCT No.: PCT/JP2016/059432
§ 371 (c)(1),
(2) Date: Dec. 20, 2016

(87) PCT Pub. No.: WO2016/158680
PCT Pub. Date: Oct. 6, 2016

(65) Prior Publication Data
US 2017/0192256 A1 Jul. 6, 2017

(30) Foreign Application Priority Data

Apr. 3, 2015 (JP) .................................. 2015-077187

(51) Int. Cl.
*G02C 7/12* (2006.01)
*G02C 1/06* (2006.01)
(Continued)

(52) U.S. Cl.
CPC .......... *G02C 7/12* (2013.01); *B29D 11/00009* (2013.01); *B29D 11/00644* (2013.01);
(Continued)

(58) Field of Classification Search
CPC .......... G02C 7/12; G02C 7/108; G02C 7/022; G02C 1/10; G02C 2202/16; G02B 1/041;
(Continued)

(56) References Cited

U.S. PATENT DOCUMENTS

| 4,498,919 A | 2/1985 | Mann |
| 4,711,539 A | 12/1987 | Krusas et al. |

(Continued)

FOREIGN PATENT DOCUMENTS

| EP | 2492723 A1 | 8/2012 |
| JP | 3-79029 B2 | 12/1991 |

(Continued)

OTHER PUBLICATIONS

International Search Report for PCT/JP2016/059432 dated Jun. 21, 2016.

(Continued)

*Primary Examiner* — Tuyen Tra

(74) *Attorney, Agent, or Firm* — Birch Stewart Kolasch & Birch, LLP

(57) ABSTRACT

A functional lens which effectively prevents the separation of a functional layer in a fitting operation of a multilayer functional lens to a frame, and a pair of functional glasses with the lens are provided. The functional lens comprises a lens body and a laminate on the lens body. The laminate comprises, in sequence, a first thermoplastic resin layer, a first adhesive layer, an optically functional layer (e.g., a polarizing film), a second adhesive layer, and a second thermoplastic resin layer. The functional lens is to be fitted in a groove of a frame. The functional lens has an edge face having a shape with a peak. The peak of the edge face is positioned at a fitting side (the lens body side) relative to the first adhesive layer.

13 Claims, 2 Drawing Sheets

(51) Int. Cl.
*G02C 7/02* (2006.01)
*B29D 11/00* (2006.01)
*G02B 1/04* (2006.01)
*G02C 1/00* (2006.01)
G02C 7/10 (2006.01)
B29K 77/00 (2006.01)

(52) U.S. Cl.
CPC ........ *B29D 11/00932* (2013.01); *G02B 1/041* (2013.01); *G02C 1/06* (2013.01); *G02C 1/10* (2013.01); *G02C 7/02* (2013.01); *G02C 7/022* (2013.01); *G02C 7/108* (2013.01); *B29K 2077/00* (2013.01); *G02C 7/10* (2013.01); *G02C 2202/16* (2013.01)

(58) Field of Classification Search
CPC ........ B29D 11/00644; B29D 11/00009; B29K 2077/00
USPC ................................................. 351/41, 44, 49
See application file for complete search history.

(56) References Cited

U.S. PATENT DOCUMENTS

| | | | |
|---|---|---|---|
| 5,526,068 | A | 6/1996 | Markovitz |
| 7,445,334 | B2* | 11/2008 | Chow ............. B29D 11/00932 351/159.75 |
| 8,703,296 | B2* | 4/2014 | Fujinaka ............ B29D 11/0073 264/1.32 |
| 2002/0018177 | A1 | 2/2002 | Dillon |
| 2007/0148482 | A1 | 6/2007 | Fujinaka et al. |
| 2008/0094707 | A1 | 4/2008 | Tsukane et al. |
| 2009/0207374 | A1 | 8/2009 | Ho et al. |
| 2011/0037945 | A1 | 2/2011 | Wiand et al. |
| 2012/0206689 | A1 | 8/2012 | Ohkubo et al. |
| 2014/0146379 | A1 | 5/2014 | Sakai |
| 2015/0160479 | A1 | 6/2015 | Ohkubo et al. |
| 2015/0352681 | A1 | 12/2015 | Suzue et al. |

FOREIGN PATENT DOCUMENTS

| | | |
|---|---|---|
| JP | 5-66566 A | 9/1993 |
| JP | 2007-178920 A | 7/2007 |
| JP | 2010-113147 A | 5/2010 |
| JP | 2011-180266 A | 9/2011 |
| JP | 2012-215725 A | 11/2012 |
| JP | 2013-541730 A | 11/2013 |
| JP | 2014-106398 A | 6/2014 |
| JP | 2015-219488 A | 12/2015 |
| WO | WO 2006/040954 A1 | 4/2006 |
| WO | WO 2012/036638 A1 | 3/2012 |
| WO | WO 2014/103800 A1 | 7/2014 |

OTHER PUBLICATIONS

Written Opinion of the International Searching Authority for PCT/JP2016/059432 dated Jun. 21, 2016.
English translation of International Preliminary Report on Patentability and Written Opinion dated Oct. 12, 2017, in PCT International Application No. PCT/JP2016/059432.
Extended European Search Report for European Application No. 16772561.3, dated Mar. 9, 2018.

* cited by examiner

[Fig. 1]
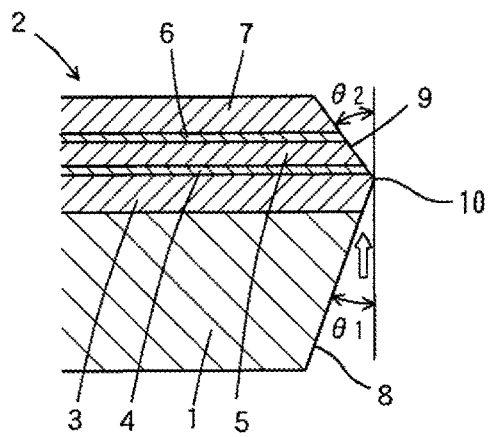
[Fig. 2]
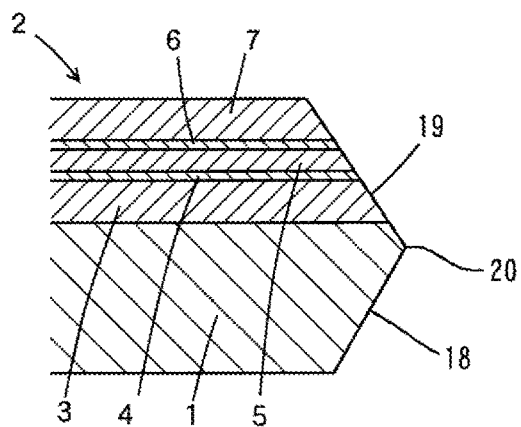
[Fig. 3]
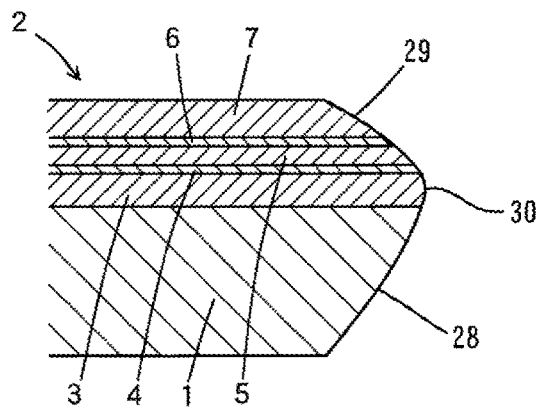

[Fig. 4]
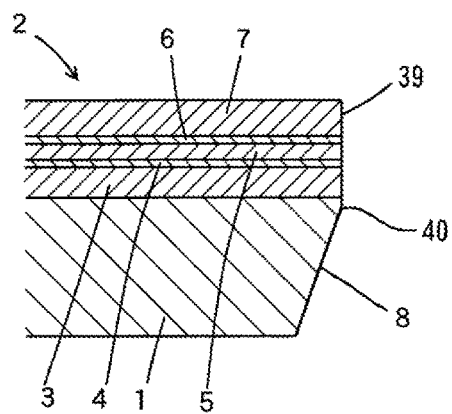
[Fig. 5]
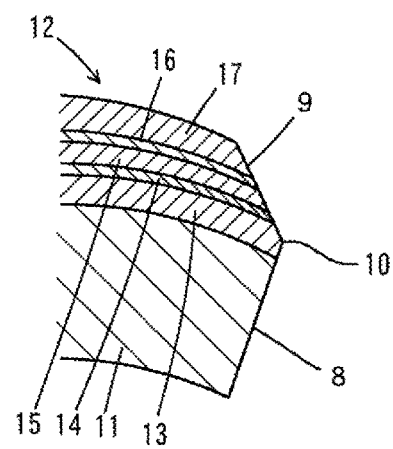
[Fig. 6]
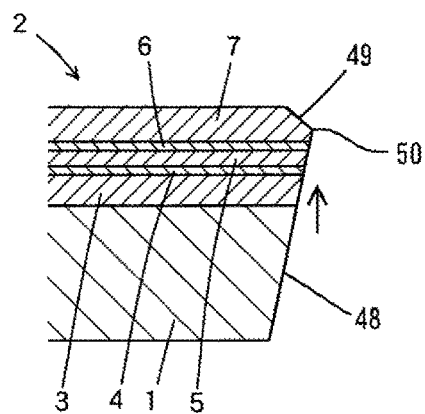

FUNCTIONAL LENS AND FUNCTIONAL EYEGLASSES PROVIDED WITH SAME

TECHNICAL FIELD

The present invention relates to a functional lens (such as a polarizing lens) having a lens body and an optically functional layer bonded to the lens body with an adhesive layer and being easy to fit to a frame without separation (or delamination) of the optically functional layer from the lens body, in a fitting operation of the lens having this structure to the frame. The present invention also relates to a pair of glasses (including a pair of polarizing sunglasses) provided with the functional lenses, and a process for producing the functional lens.

BACKGROUND ART

Polarizing lenses are used for anti-glare glasses, sunglasses, goggles, corrective glasses, or other glasses (or eyeglasses) in order to block the reflection of the light from the road surface, the wall surface, the snowy surface, the water surface, or other surfaces. Such glasses are worn for outdoor activities, for example, mountain climbing, angling, and playing baseball, driving vehicles, or other purposes. A polarizing lens has a multilayer structure containing a lens body and a polarizing layer through an adhesive layer; on the surface of the polarizing layer, a protective layer is usually laminated.

With respect to the polarizing lens having such a structure, Japanese Patent Application Laid-Open Publication No. 2014-106398 (JP-2014-106398A, Patent Document 1) discloses a polarizing lens comprising a polarizing film provided in a sandwiched manner, wherein a glass lens is provided on one side of the film and a resin lens is provided on the other side so as to form a laminated structure, and the resin lens has a thickness of 0.50 mm or less. The Figures of this document show a polarizing lens having a uniform thickness and being curved at a predetermined curvature.

Japanese Patent Application Laid-Open Publication No. 2010-113147 (JP-2010-113147A, Patent Document 2) discloses a polarizing lens comprising a polarizing plate and a thermoplastic resin layer laminate-molded thereon. The polarizing plate comprises a poly(vinyl alcohol) polarizing thin film and an acetyl cellulose protective film bonded to either side of the polarizing thin film with an adhesive composed of a mixture of an epoxy resin and an acid anhydride. This document discloses that a polycarbonate resin is molded by injection molding or other methods to form a molded resin layer. The Figures of the document show that one of the protective films is curved to form a convex front surface of the lens, the resin molded layer is formed on a concave of the polarizing plate by injection molding to form a flat rear surface of the lens, and the lens has a flat edge face in a circumferential direction thereof.

Japanese Patent Application Laid-Open Publication No. 2011-180266 (JP-2011-180266A, Patent Document 3) discloses a polarizing laminate comprising a linear polarizer, a protective function part (a cast molded sheet, a stretched and oriented sheet, or an extrusion molded sheet having a thickness of 0.25 mm or less) laminated on a first side of the linear polarizer, and a thermal bonding function portion (an extrusion molded thermal bonding sheet) laminated on a second side of the linear polarizer. This document also discloses that a polarizing lens is produced by heat-bending a flat polarizing lens composed of the polarizing laminate to give a curved polarizing lens, inserting the curved polarizing lens into a mold, and injection-molding a backup resin (a polycarbonate resin, a polyamide resin, a polyester resin, a polyurethane resin, a polyacrylic resin, a polycycloolefin resin) to the thermal bonding function portion (a side facing user's eyes) of the curved polarizing lens to form a lens body. The Figures of this document show that a polarizing lens is obtained by injection-molding a polycarbonate resin, a polyamide resin, or other resins on a polarizing laminate bent at a predetermined curvature (a curved polarizing lens) to form a curved lens body with the same thickness ratio.

The polarizing lenses described in these documents have a flat edge face and are thus difficult to fit (or mount) in a groove (or a bezel) of a frame (or a groove of a frame rim). Fitting such a polarizing lens to a frame separates the polarizing layer from the adhesive layer at an edge of the polarizing lens in some cases and reduces the yield and efficient production of polarizing glasses. In particular, for a rigid metallic frame, the polarizing lens is difficult to fit due to low flexibility or bendability thereof, and additionally, the separation (or delamination) easily occurs at an edge of the polarizing lens. With respect to a frame made of a resin such as a cellulose acetate, the resin frame can be softened by heat to easily fit the polarizing lens to the frame. In this fitting operation, need of heating reduces an efficiency of the fitting operation. In addition, the separation as described above easily occurs probably due to softening of the adhesive layer. The polarizing lens is fitted to the frame more tightly, the polarizing layer is separated at an edge of the polarizing lens more easily.

International Publication No. WO2006/040954 (Patent Document 4) discloses a protective film for a polarizing film; the protective film comprises an alicyclic polyamide resin and has a retardation value of not less than 300 nm. This document describes that a polarizing lens is produced by laminating a polyamide layer on either side of a polarizing film through a urethane-series adhesive layer to give a multilayer protective film, bending the multilayer protective film, and injection-molding an alicyclic polyamide resin on the inside of the film.

CITATION LIST

Patent Literature

Patent Document 1: JP-2014-106398A (Claims and FIG. 1)

Patent Document 2: JP-2010-113147A (Claims, paragraph [0021], Examples, and FIG. 1)

Patent Document 3: JP-2011-180266A (Claims and FIG. 1)

Patent Document 4: WO2006/040954 (Claims and Examples)

SUMMARY OF INVENTION

Technical Problem

It is therefore an object of the present invention to provide a multilayer functional lens which effectively prevents the separation of a functional layer even in fitting the multilayer functional lens to a frame, and to provide a pair of functional glasses (or eyeglasses) with the functional lenses.

Another object of the present invention is to provide a functional lens which effectively prevents the separation of a functional layer even if the functional lens is tightly fitted to a frame, and to provide a pair of functional glasses (or eyeglasses) with the functional lenses.

It is still another object of the present invention to provide a lightweight functional lens which has a highly integrated multilayer structure and prevents the separation of a functional layer over a long period of time, and to provide a pair of functional glasses (or eyeglasses) with the functional lenses.

Solution to Problem

The inventor of the present invention made intensive studies to achieve the above objects and finally found that a multilayer functional lens which has an edge face formed in a ridge shape with a peak positioned (or situated) at an interior side (a fitting side) relative to an adhesive layer prevents the adhesive layer from contacting with a frame and eliminates separation (or delamination) of a functional layer at an edge of the functional lens in a fitting operation of the lens to the frame. The present invention was accomplished based on the above findings.

That is, an aspect of the present invention provides a functional lens which has a multilayer structure (or a laminated structure) comprising, in sequence directly or indirectly, a lens body, an adhesive layer, and an optically functional layer; the functional lens is to be fitted (or mounted) in a groove (or a bezel) of a frame of glasses (or eyeglasses). The functional lens has an edge face to (or relative to, or in relation to) the groove, and the edge face has a shape (or a form) with a peak positioned (or situated) at a fitting side relative to the adhesive layer in the thickness direction of the lens. Specifically, the edge face has an inclined surface (or a curved surface) which is inclined linearly or curvedly to form a peak in the thickness direction of the lens. The peak of the edge face is positioned or situated at a fitting side (or interior side) relative to the adhesive layer.

The functional lens for being fitted in a groove of a frame may comprise a lens body and a laminate; the laminate may comprise an optically functional layer and may be laminated on the lens body. The laminate may comprise a first thermoplastic resin layer bonded to the lens body, and a first adhesive layer between the first thermoplastic resin layer and the optically functional layer; the edge face to the groove may have a shape with a peak in the thickness direction of the lens, and the peak of the edge face may be positioned (or situated) at or near the first thermoplastic resin layer relative to the first adhesive layer (or may be disposed upstream of the adhesive layer to the fitting direction).

The lens may have a first face on a near side of a fitting portion (or side) for being fitted in the groove of the frame and a second face, and at least the fitting portion may have an edge face having at least a guide portion which is inclined or curved outward (or outwardly) in a direction (a thickness direction) from the first face of the lens toward the second face of the lens (or is inclined or curved toward a direction away from the central axis of the lens body). The edge face may have a linearly bent mountain shape or a curved mountain shape (or swelling curved shape) in cross-sectional view.

The functional lens may have a laminate comprising, in sequence: a first thermoplastic resin layer, a first adhesive layer, the optically functional layer, a second adhesive layer, and a second thermoplastic resin layer. For example, the functional lens may comprise a lens body, a polarizing film laminated on the lens body, and a protective layer laminated on the polarizing film, or may comprise a lens body and a polarizing protective laminate, wherein the polarizing protective laminate may comprise, in sequence, a first thermoplastic resin layer on the lens body, a first adhesive layer, a polarizing film, a second adhesive layer, and a second thermoplastic resin layer.

The first resin layer may be melt-bonded (or fused and bonded) to the lens body. The melt-bonding increases the bonding strength between the first resin layer and the lens body in comparison with the adhesive strength between the first resin layer and the first adhesive layer.

The frame may comprise a metal or a resin (for example, a cellulose acylate or a cellulose-series resin, and a polyamide resin). The lens body may comprise at least one transparent resin selected from the group consisting of a polycarbonate resin, a polyamide resin, a polyester resin, a cyclic olefin resin, an acrylic resin, and a urethane resin. For example, the lens body may comprise a polyamide resin having an aliphatic hydrocarbon ring. The optically functional layer may for example be at least one functional layer selected from the group consisting of a polarizing layer, an anti-glare layer, a light-control layer, an anti-reflection layer, and a coloring layer. The first thermoplastic resin layer and the second thermoplastic resin layer each may independently comprise at least one transparent resin selected from the group consisting of a cellulose acylate, a polycarbonate resin, a polyamide resin, a polyester resin, a cyclic olefin resin, an acrylic resin, and a urethane resin. For example, the first thermoplastic resin layer may comprise a polyamide resin, and the second thermoplastic resin layer may comprise a polyamide resin or a cellulose acylate. The first and second adhesive layers each may comprise a urethane-series adhesive.

Another aspect of the present invention provides a pair of functional glasses (or eyeglasses or spectacles) which may comprise the functional lenses (such as polarizing lenses) and a frame to which the functional lenses are fitted. The pair of functional glasses may further comprise temples attached to the frame. The pair of functional glasses may be a pair of corrective glasses [for example, a pair of prescription glasses for correcting farsightedness (hypermetropia) and/or near-sightedness (myopia)] or a pair of polarizing glasses or sunglasses (a pair of corrective or non-corrective polarizing glasses or sunglasses).

A further aspect of the present invention provides a process for producing a functional lens (a functional lens for being fitted in a groove (or a bezel) of a frame, the lens comprising, in sequence directly or indirectly, a lens body, an adhesive layer, and an optically functional layer) by processing an edge face of a lens. The process comprises cutting an edge face, to be fitted to the groove, of a lens into a shape having a peak positioned (or situated) at a fitting side relative to the adhesive layer in the thickness direction of the lens.

Advantageous Effects of Invention

According to the present invention, the multilayer functional lens has an edge face having a ridge (or protrusion) with a peak positioned at a fitting side relative to the adhesive layer (the first adhesive layer) (at an upstream side in the fitting direction). Thus, even in a fitting operation of the multilayer functional lens to a frame, no frictional contact of the adhesive layer with the frame occurs, effectively preventing the separation (or delamination) of the functional layer. In particular, the separation (or delamination) of the functional layer is effectively preventable even if the polarizing lens is tightly fitted to the frame. Further, in a case where the lens body is melt-bonded to the resin layer of the laminate, the resulting functional lens has a highly integrated multilayer structure and prevents the separation of the functional layer over a long period of time. Furthermore, the lens body formed with a transparent resin or a lightweight resin provides a lightweight and easily handleable functional lens.

BRIEF DESCRIPTION OF DRAWINGS

FIG. 1 is a schematic cross-sectional view of a functional lens in accordance with an embodiment of the present invention.

FIG. 2 is a schematic cross-sectional view of a functional lens in accordance with another embodiment of the present invention.

FIG. 3 is a schematic cross-sectional view of a functional lens in accordance with still another embodiment of the present invention.

FIG. 4 is a schematic cross-sectional view of a functional lens in accordance with still another embodiment of the present invention.

FIG. 5 is a schematic cross-sectional view of a functional lens in accordance with still another embodiment of the present invention.

FIG. 6 is a schematic cross-sectional view of a functional lens in accordance with an embodiment of Comparative Examples.

DESCRIPTION OF EMBODIMENTS

Hereinafter, the present invention will be explained in detail with reference to the drawings if necessary. FIG. 1 is a schematic cross-sectional view of a functional lens in accordance with an embodiment of the present invention. Incidentally, in the following embodiments, a functional lens is fitted in a groove (or a bezel) of a frame with a lens body of the lens directed toward the frame unless otherwise noted. Thus, the fitting side of the functional lens means the lens body side of the functional lens.

In this embodiment, a plastic lens body 1 and a five-layer laminate 2 containing a polarizing layer (a polarizing film) are bonded or joined to form a polarizing lens. Specifically, the laminate 2 has a laminate structure comprising, in sequence, a first thermoplastic resin layer 3, a first adhesive layer 4, a polarizing film (containing a poly(vinyl alcohol) and a dichroic dye) 5, a second adhesive layer 6, and a second thermoplastic resin layer 7. The plastic lens body 1 is melt-bonded (or fused and bonded) to the first thermoplastic resin layer 3 by insert molding (injection molding), and is integrated with the laminate 2. In this embodiment, the lens body 1 comprises a polyamide resin (a transparent polyamide resin) having an aliphatic hydrocarbon ring, the first and second thermoplastic resin layers 3, 7 also comprise the polyamide resin, and the second thermoplastic resin layer 7 serves as a protective layer for the polarizing film 5. The first and second adhesive layers (adhesive portions) 4, 6 comprise a urethane-series adhesive.

The polarizing lens has an edge face having a ridge formed by cutting, and thus the edge face has a linearly bent mountain shape in cross-sectional view. The ridge on the edge face has a peak positioned (or situated) at the side of the first thermoplastic resin layer 3 relative to the first adhesive layer 4 (the fitting side, or the upstream side in the fitting direction of the lens relative to the frame). More specifically, the lens has a first face for a fitting side to a frame (or the surface of the lens body 1) and a second face (or the surface of the second thermoplastic resin layer 7); the ridge on the edge face has a first inclined wall (slope) (a guide portion) 8 and a second inclined wall (slope) (an engagement portion) 9; and the first inclined wall 8 is linearly inclined at an angle $\theta 1$ outward or outwardly (or toward a direction away from the central axis of the lens body) in a direction (or a thickness direction) from the first face toward the second face, and the second inclined wall 9 is linearly inclined at an angle $\theta 2$ extending inward or inwardly (or toward a direction approaching the central axis of the lens body) in a direction from a peak 10 of the guide portion toward the second face (the surface of the second thermoplastic resin layer 7). The peak 10 is situated on the edge face of the first thermoplastic resin layer 3 away from the first adhesive layer 4. The central axis of the lens body is parallel with the optical axis of the lens body.

For this polarizing lens, which has the maximum diameter at the peak 10 of the edge face, the first adhesive layer 4 has no contact with the frame even if the polarizing lens receives a force in the direction of the white arrow shown in FIG. 1 in fitting the polarizing lens to the frame with the lens body 1 directed toward a groove of the frame. Furthermore, since the lens body 1 is strongly bonded or joined to the first thermoplastic resin layer 3 by melt-bonding, the first thermoplastic resin layer 3 is not separated from the lens body 1. Thus, this shape (or configuration) of the lens can effectively prevent the separation of the polarizing film 5, including the first adhesive layer 4, at the edge of the polarizing lens. In particular, even if the lens is closely fitted to a frame with a high rigidity (such as a metallic frame) or a plastic frame having a thermal flexibility, the separation of the polarizing film 5, including the first adhesive layer 4, is prevented. The lens body 1 and the first and second thermoplastic resin layers 3, 7 comprise the polyamide resin, and thus not only have a high transparency and excellent optical characteristics but also are lightweight, hard to break, and easy to handle. Furthermore, in a fitting operation of the lens into the groove of the frame, the inclined wall (guide portion) 8, which is positioned in the upstream side in the fitting direction, can serve as a guide wall (or face), and the inclined wall (engagement portion) 9, which is positioned in the downstream side in the fitting direction, may be used as an engagement wall (or face) to the groove.

The peak of the edge face is positioned at the fitting side relative to the adhesive layer (the first adhesive layer) in the thickness direction. In the above-mentioned embodiment, for example, the peak is positioned at the frame-fitting side relative to the first adhesive layer 4, or may be positioned at the lens body side (fitting side). In the embodiment shown in FIG. 2, a polarizing lens comprises a lens body 1 and a five-layer laminate 2, as the same as in the above embodiment. In the same manner as the first inclined wall (guide portion) 8 and the second inclined wall (engagement portion) 9, the lens has an edge face having a ridge with a linearly extending first inclined wall (guide portion) 18 and a linearly extending second inclined wall (engagement portion) 19, and these inclined walls form a peak 20 of the edge face at the intersection thereof. The peak 20 is positioned (or situated) on the edge face of lens body 1.

In a fitting operation of this polarizing lens to a frame, the first thermoplastic resin layer 3 has no contact with the frame, and the separation of the polarizing film 5, including the first adhesive layer 4 can be more effectively prevented. In particular, the polarizing lens having such a shape (or a form) prevents the separation of the polarizing film 5 in the fitting process of the lens to the frame if the lens body 1 and the first thermoplastic resin layer 3 are bonded through an adhesive layer interposed therebetween without melt-bonding of the lens body 1 to the first thermoplastic resin layer 3.

The edge face of the functional lens is formed to have a peak in the thickness direction. The edge face does not necessarily have a linearly bent mountain shape in cross-sectional view. The edge face may have a curved mountain shape in cross-sectional view. Specifically, the peak of the edge face is not limited to an acute-angled or obtuse-angled peak, and may be a swollen curved peak. In the embodiment shown in FIG. 3, a polarizing lens comprises a lens body 1 and a five-layer laminate 2, as the same as in the above embodiments. The polarizing lens has a ridge on a circumferential edge face thereof. The lens has a first face for a fitting side relative to a frame (or the surface of the lens body 1) and a second face (or the surface of the second thermoplastic resin layer 7); the ridge has a first inclined wall (guide portion) 28 and a second inclined wall (engagement portion) 29; and the first inclined wall 28 is linearly or curvedly inclined outward (or toward a direction away from the central axis of the lend body) in a direction (or a thickness direction) from the first face toward the second face, and the second inclined wall 29 is curvedly inclined inward (or toward a direction approaching the central axis of the lens body) in a direction from a peak 30 of the guide portion toward the second face (or the surface of the second thermoplastic resin layer 7). These inclined walls form a curved face which swells or protrudes outward with respect to the edge face. The peak 30 of the edge face is positioned (or situated) on the edge face of the first thermoplastic resin layer 3 away from the first adhesive layer 4 in the same manner as the embodiment shown in FIG. 1.

The polarizing lens having such a shape (or form) can also effectively prevent the separation of the polarizing film 5, including the first adhesive layer 4, as the same as in the embodiment shown in FIG. 1.

The edge face, which forms the outer circumferential surface of the functional lens, is molded or cut into a shape having a peak in the thickness direction (a shape which swells or protrudes outward with respect to the edge face). The peak may be formed by a linearly inclined slope and a curvedly inclined slope. Specifically, the edge face may be formed to have a linearly bent mountain shape and/or a curvedly bent mountain shape (or curvedly swollen shape) in cross-sectional view.

An edge face of at least a fitting portion for being fitted in a groove of a frame has a guide portion which is inclined or curved outward (or toward a direction away from the central axis of the lens body) in a direction (or a thickness direction) from the first face (the surface of the fitting side) toward the second face; and the edge face has a peak positioned at the fitting side relative to the adhesive layer. For example, as shown in FIG. 4, the edge face, which forms the outer circumferential surface of the functional lens, has a first inclined wall (guide portion) 8 on the side of the lens body 1 and a flat vertical wall (or face) (engagement portion) 39 on the side of the laminate 2; the first inclined wall 8 is linearly inclined as shown in FIG. 1, and the flat vertical wall 39 extends in a parallel direction with the central axis of the lens body 1. The intersection of the first inclined wall (guide portion) 8 and the flat engagement portion (vertical wall) 39 forms a peak 40.

In the fitting operation of the polarizing lens into the groove of the frame, frictional contact of the first adhesive layer 4 and the second adhesive layer 6 with the frame is preventable.

In the above-mentioned embodiments shown in the Figures, the polarizing lenses have flat surfaces. As shown in FIG. 5, the polarizing lens may have a curved surface in cross-sectional view by a bending (curving) processing or other processing. In this embodiment, a laminate 12 is shaped by a curving processing and is inserted in a mold, and a polyamide resin is injection-molded on a curved first thermoplastic resin layer 13, in the same manner as described above, to form a lens body 11 having a curved cross section. In the same manner as FIG. 1, the edge face, which forms the outer circumferential surface of the polarizing lens, has a first inclined wall (guide portion) 8 on the side of the lens body 11 and a second inclined wall (engagement portion) 9 on the side of the laminate 12, and the intersection of these inclined walls 8, 9 forms a peak 10. The peak is positioned (or situated) on the edge face of the first thermoplastic resin layer 13. The laminate 12 has a first adhesive layer 14, a second adhesive layer 16, a polarizing film 15, and a second thermoplastic resin layer (a protective layer) 17.

As apparent from the above-mentioned embodiments, in a case where the functional lens contains a plurality of adhesive layers, the edge face of the functional lens has a peak positioned at the fitting side (the lens body side for the embodiments) relative to all of the adhesive layers in order to prevent the adhesive layers from contacting with the frame in the fitting process.

In the above-mentioned embodiments shown in the Figures, the functional lens is fitted from the front side (an outer-facing side, a first side) of the frame toward the rear side [a side facing user's eyes (a user-facing side), a second side] thereof. In contrast, in a case where the functional lens is fitted from the rear side of the frame toward the front side thereof, the edge face of the functional lens has a guide portion (such as the first inclined wall) inclined or curved at an angle θ1 outward (or toward a direction away from the central axis of the lens body) from the first face of the lens toward the second face of the lens, and an engagement portion (such as the second inclined wall) inclined or curved at an angle θ2 inward (or toward a direction approaching the central axis of the lens body) from a peak of the edge face toward the second face. The peak of the edge face is positioned at the rear side (the fitting side) relative to the adhesive layer.

With respect to the shape of the edge face of the functional lens, the angle θ1 of the first inclined wall relative to the central axis of the lens body (for a curved inclined wall, the angle of the line connecting the foot of the inclined wall and the peak thereof) may be over 0°, for example, about 3 to 70° (e.g., about 5 to 60°), preferably about 10 to 50° (e.g., about 15 to 45°), and more preferably about 15 to 30°. The first inclined wall having too small an angle θ1 fails to prevent the adhesive layer or the optically functional layer from contacting with the frame. The first inclined wall having too large an angle θ1 reduces the strength of the lens edge and is liable to reduce a function of a guide wall (or face) in the fitting operation. The angle θ2 of the second inclined wall relative to the central axis of the lens body may be not smaller than 0°, for example, about 0 to 80° (e.g., about 5 to 70°), preferably about 10 to 60° (e.g., about 15 to 50°), and more preferably about 15 to 45°. The second inclined wall having too small an angle θ2 easily brings the adhesive layer or the optically functional layer into contact with the frame in the operation of fitting the lens to the frame. The second inclined wall having too large an angle θ2 tends to reduce the strength of the lens edge.

The functional lens can be produced by, for example, cutting the edge face to be fitted in the groove of the frame into a shape which has a peak positioned at the fitting side relative to the adhesive layer in the thickness direction.

The functional lens comprises a lens body, an adhesive layer, and an optically functional layer directly or indirectly laminated in this order, and it is not necessarily that the functional lens may be a polarizing lens containing a five-layer laminate. For example, the laminate laminated on the lens body may include a two-layer laminate having an adhesive layer bondable to the lens body and an optically functional layer on the adhesive layer (a two-layer laminate having an adhesive layer and an optically functional layer); a three-layer laminate having a first resin layer bondable to the lens body, an adhesive layer, and an optically functional layer; and a five-layer laminate having a first resin layer bondable to the lens body, an adhesive layer, an optically functional layer, an adhesive layer, and a second resin layer. In order to protect the optically functional layer, the laminate usually has a protective layer (or a resin layer) laminated on the optically functional layer. In a preferred embodiment, the laminate has a unit having a first thermoplastic resin layer (a resin layer), a first adhesive layer, and an optically functional layer laminated in this order. The laminate may be an optically functional protection laminate (or a protection sheet) having a first thermoplastic resin layer, a first adhesive layer, an optically functional layer, a second adhesive layer, and a second thermoplastic resin layer laminated in this order.

The lens body may be composed of a glass (e.g., an optical glass), or may be composed of a transparent resin in the light of weight saving. The transparent resin may include, for example, a polycarbonate resin (e.g., bisphenol-based polycarbonate resin such as a bisphenol A-based polycarbonate resin), a polyamide resin (e.g., an aliphatic polyamide resin, an alicyclic polyamide resin, and an aromatic polyamide resin), a polyester resin [e.g., a poly($C_{2-4}$alkylene-$C_{6-12}$arylate) resin such as a poly(ethylene terephthalate) or a poly(ethylene naphthalate), an aromatic co-polyester resin having a $C_{2-4}$alkylene-$C_{6-12}$arylate unit, and a homo- or co-polyester resin having a fluorene unit], a cyclic olefin resin [e.g., a cyclic olefin homopolymer (COP), a copolymer of a cyclic olefin and a copolymerizable monomer (a chain olefin such as ethylene) (COC), for example, an olefinic resin having a norbornane ring, such as a homo- or co-polymer (including a polymer obtainable by ring-opening metathesis polymerization) of a cyclic olefin (such as norbornene) or a cyclic diene (such as dicyclopentadiene)], an acrylic resin, and a urethane resin. These transparent resins may be used alone or in combination as far as optical characteristics such as transparency are not damaged.

Among these transparent resins, the polyamide resin allows formation of a lightweight and strong lens body having a high chemical resistance.

The polyamide resin may be prepared by polymerization (polycondensation) of a first amide-forming component containing a diamine and a dicarboxylic acid, may be prepared by polymerization (polycondensation) of a second amide-forming component containing an aminocarboxylic acid and/or a lactam, or may be prepared by polymerization (polycondensation) of the first amide-forming component and the second amide-forming component.

The first amide-forming component which forms an aliphatic polyamide may include, for example, an alkylenediamine (e.g., a $C_{4-14}$alkylenediamine such as hexamethylenediamine or dodecanediamine) and an alkanedicarboxylic acid (e.g., a $C_{4-14}$alkanedicarboxylic acid such as adipic acid, sebacic acid, or dodecanedioic acid). The second amide-forming component may include, for example, a lactam (e.g., a $C_{4-16}$lactam such as ε-caprolactam or ω-laurolactam), an aminocarboxylic acid (e.g., an amino$C_{4-16}$carboxylic acid such as ε-aminoundecanoic acid), or other components. Examples of the aliphatic polyamide resin may include a homopolyamide resin of the first amide-forming component (e.g., a polyamide 66, a polyamide 610, a polyamide 612, and a polyamide 1010), a homopolyamide resin of the second amide-forming component (e.g., apolyamide 6, apolyamide 11, and a polyamide 12); a copolyamide resin, for example, a copolyamide resin of different kinds of amide-forming components (the first amide-forming component and/or the second amide-forming component), e.g., 6/12 (a copolymer of 6-aminocaproic acid and 12-aminododecanoic acid); 6/12/66 (a copolymer of 6-aminocaproic acid, 12-aminododecanoic acid, hexamethylenediamine, and adipic acid); and a polyamide 6/11, a polyamide 6/12, a polyamide 66/11, and a polyamide 66/12.

The alicyclic polyamide resin, which has an aliphatic hydrocarbon ring, may be a homo- or co-polyamide resin containing at least one member selected from the group consisting of an alicyclic diamine and an alicyclic dicarboxylic acid as a monomer. The alicyclic diamine may include a diamino$C_{5-10}$cycloalkane such as diaminocyclohexane; a bis(amino$C_{5-10}$cycloalkyl)$C_{1-6}$alkane such as bis(4-aminocyclohexyl)methane, bis(4-amino-3-methylcyclohexyl)methane, or 2,2-bis(4'-aminocyclohexyl)propane; or other diamines. The alicyclic diamine may have a substituent such as an alkyl group (a $C_{1-4}$alkyl group such as methyl group or ethyl group, preferably a $C_{1-2}$alkyl group). The alicyclic dicarboxylic acid may include a $C_{5-10}$cycloalkane-dicarboxylic acid such as a cyclohexane-1,4-dicarboxylic acid or a cyclohexane-1,3-dicarboxylic acid, or other dicarboxylic acids.

The alicyclic polyamide resin may be a polymer (homo- or co-polyamide resin) of the alicyclic diamine and/or the alicyclic dicarboxylic acid and the first and/or second amide-forming component(s) for the aliphatic polyamide resin.

A preferred alicyclic polyamide resin may include, for example, a homo- or co-polyamide resin of an amide-forming component at least containing a first amide-forming component composed of a bis(aminocycloalkyl)alkane and an alkanedicarboxylic acid (for example, if necessary, a copolyamide resin of the second amide-forming component for the aliphatic polyamide resin and the above first amide-forming component). The bis(aminocycloalkyl)alkane may include a bis(amino$C_{5-10}$cycloalkyl)$C_{1-6}$alkane, preferably a bis(amino$C_{6-8}$cycloalkyl)$C_{1-4}$alkane, and more preferably a bis(aminocyclohexyl)$C_{1-3}$alkane. The alkanedicarboxylic acid may include a $C_{4-18}$alkanedicarboxylic acid, preferably a $C_{6-16}$alkanedicarboxylic acid, and more preferably a $C_{8-14}$alkanedicarboxylic acid. Representative examples of the alicyclic polyamide resin may include a homo- or co-polyamide resin containing a unit of at least an alicyclic polyamide resin (an alicyclic polyamide resin containing an alicyclic diamine and an alkanedicarboxylic acid as monomers) represented by the following formula (1):

[Chem. 1]

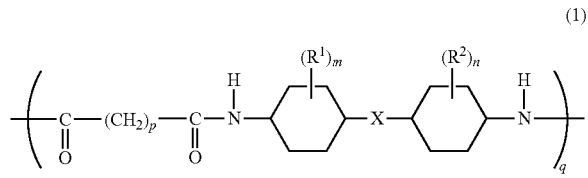

(1)

wherein X represents an alkylene group, $R^1$ and $R^2$ are the same or different and each represent an alkyl group, m and n denote 0 or an integer of 1 to 4, p and q denote an integer of not less than 1.

In the formula (1), the alkylene group represented by the group X may include a $C_{1-6}$alkylene group (or alkylidene group) such as methylene, ethylene, ethylidene, propylene, trimethylene, 2-propylidene, or butylene group, preferably a $C_{1-4}$alkylene group (or alkylidene group), and more preferably a $C_{1-3}$alkylene group (or alkylidene group).

For the substituents $R^1$ and $R^2$, the alkyl group may include, for example, a $C_{1-4}$alkyl group such as methyl or ethyl group, and preferably a $C_{1-2}$alkyl group. Each of the number m of substituents $R^1$ and the number n of substituents $R^2$ may usually be 0 or an integer of 1 to 3, preferably 0 or an integer of 1 to 2, and more preferably 0 or 1. The positions of the substituents $R^1$ and $R^2$ may usually be 2-position, 6-position (or 3-position, 5-position) with respect to the amide group.

In the formula (1), the coefficient p may for example be about 4 to 20, preferably about 6 to 18, and more preferably about 8 to 16. In the formula (1), the number q (the degree of polymerization) may for example be about 10 to 1000, preferably about 30 to 800, and more preferably about 50 to 750 (e.g., about 100 to 500).

The alicyclic polyamide resin, which has a high transparency, is known as a transparent polyamide resin. The alicyclic polyamide resin can be available as, for example, "Torogamid" from Daicel-Evonik Ltd. and "Grilamid" from EMS-Chemie Holding AG. The alicyclic polyamide resins may be used alone or in combination.

The aromatic polyamide resin may include a polyamide resin in which at least one component in the first amide-forming components for forming the aliphatic polyamide resin (e.g., the alkylenediamine such as a $C_{4-14}$alkylenediamine, and the alkanedicarboxylic acid such as a $C_{4-14}$alkanedicarboxylic acid) is an aromatic component; such a polyamide resin may include, for example, a polyamide resin containing an aromatic diamine as a monomer [for example, a condensation product of an aromatic diamine (e.g., metaxylylenediamine) and an alkanedicarboxylic acid, such as MXD-6] and a polyamide resin containing an aromatic dicarboxylic acid as a monomer [for example, a condensation product of an aliphatic diamine (e.g., trimethylhexamethylenediamine) and an aromatic dicarboxylic acid (e.g., terephthalic acid or isophthalic acid)].

As the polyamide resin, there may be used a homo- or co-polyamide resin containing a dimer acid as a monomer, a polyamide resin having a branched chain structure derived from a small amount of polyfunctional polyamine and/or polycarboxylic acid components, a modified polyamide resin (e.g., an N-alkoxymethylpolyamide resin), or other resins. The polyamide resin may be a thermoplastic elastomer.

These polyamide resins may be used alone or in combination. Among these polyamide resins, the alicyclic polyamide resin is preferred.

The number-average molecular weight of the polyamide resin can be measured by gel permeation chromatography (GPC) or other means and may for example be about $0.6 \times 10^4$ to $30 \times 10^4$ (e.g., about $0.6 \times 10^4$ to $10 \times 10^4$), preferably about $1 \times 10^4$ to $20 \times 10^4$ (e.g., about $0.7 \times 10^4$ to $10 \times 10^4$), and more preferably about $2 \times 10^4$ to $15 \times 10^4$ (e.g., about $0.8 \times 10^4$ to $10 \times 10^4$) in terms of polystyrene.

The polyamide resin may have a specific gravity of not more than 1.15 g/cm³ (e.g., about 1.01 to 1.10 g/cm³, particularly about 1.01 to 1.05 g/cm³). The polyamide resin may be any amorphous or crystalline polyamide resin having a high transparency. In particular, from the point of view of chemical resistance, the polyamide resin may be a microcrystalline polyamide resin, for example, a polyamide resin having a degree of crystallization of about 1 to 20%, preferably about 1 to 10%, and more preferably about 1 to 8% [e.g., the above-mentioned alicyclic polyamide resin such as the alicyclic polyamide resin represented by the formula (1)]. The crystalline polyamide resin may be a microcrystalline polyamide resin which has no scattering of visible light and contains an extremely fine crystal (a crystal having a size smaller than a wavelength of visible light). The degree of crystallization can be measured by usual thermal analysis (a differential scanning calorimeter) based on a heat of fusion from an endothermic peak area (S) of the polyamide resin. The heat of fusion may for example be not more than 30 J/g (e.g., about 1 to 30 J/g), preferably not more than 20 J/g (e.g., about 2 to 20 J/g), and more preferably not more than 17 J/g (about 3 to 17 J/g).

The polyamide resin may have a thermal melting temperature (or a melting point). The thermal melting temperature (Tm) may for example be about 100 to 300° C., preferably about 110 to 280° C., and more preferably about 130 to 260° C. In particular, the polyamide resin having a crystallinity (in particular, microcrystallinity) may have a thermal melting temperature (Tm) of, for example, about 150 to 300° C., preferably about 180 to 280° C., and more preferably about 210 to 260° C.

The polyamide resin has a high Abbe number compared with a polycarbonate resin or other resins in many cases and can efficiently prevent the generation of chromatic aberration. The Abbe number of the polyamide resin measured under the conditions of Japanese Industrial Standards (JIS) K7142 may be selected from the range of not less than 30 (e.g., about 35 to 65) or may for example be about 40 to 60, preferably about 42 to 58, and more preferably about 44 to 55.

The polyamide resin has a small optical strain compared with a polycarbonate resin or other resins. The photoelastic coefficient (unit: $\times 10^{-13}$ cm²/dyn) of the polyamide resin measured by a phase-difference measuring apparatus ("KOBRA-WPR" manufactured by Oji Scientific Instruments) may for example be about 20 to 60 (e.g., about 25 to 55), preferably about 30 to 50, and more preferably about 35 to 45.

The polyamide resin has a small flexural modulus and a large elasticity compared with a polycarbonate resin or other resins, and thus prevents cracking or other damages in the fitting operation of the functional lens to a frame. The flexural modulus of the polyamide resin measured in accordance with ISO 527 (temperature: 23° C., 50% RH) may for example be about 1000 to 2000 MPa, preferably about 1200 to 1800 MPa, and more preferably about 1300 to 1700 MPa. The tensile breaking of the polyamide resin measured in accordance with ISO 527 (temperature: 23° C., 50% RH) may be not less than 100%, for example, about 100 to 300%, preferably about 120 to 250%, and more preferably about 150 to 200%.

The transparent resin (such as a polyamide resin) which forms the lens body may contain various additives, for example, a stabilizer (such as a heat stabilizer, an ultraviolet absorber, or an antioxidant), a plasticizer, a lubricant, a coloring agent, a flame retardant, and an antistatic agent.

Incidentally, the thickness of the lens body, which can be selected according to the purpose of glasses, may usually be about 2 to 20 mm (e.g., about 3 to 17 mm, and preferably about 5 to 15 mm).

As the optically functional layer, various layers or films which function optically can be used. For example, the optically functional layer may be a polarizing layer (or a polarizing film), an anti-glare layer, a light-control layer, an anti-reflection layer, a coloring layer, or other layers. These optically functional layers may be used alone or in combination to form a composite functional layer (for example, a composite layer composed of a polarizing layer and a coloring layer bonded with an adhesive layer). The optically functional layer usually contains at least a polarizing layer. The polarizing layer may be formed with a stretched film of a poly(vinyl alcohol) resin containing a dichroic compound such as iodine or a dichroic dye (or pigment). The polarizing layer may for example be prepared by dyeing a poly(vinyl alcohol) resin film with a dichroic compound, crosslinking the dyed film, and subjecting the resulting film to a stretching treatment (a monoaxially stretching treatment at a stretching ratio of about 3 to 7).

The optically functional layer may be subjected to a surface treatment if necessary, such as a corona discharge treatment or an anchor coat treatment.

The optically functional layer may have a thickness of, for example, about 10 to 100 µm, preferably about 20 to 70 µm, and more preferably about 25 to 60 µm (e.g., about 30 to 50 µm).

The adhesive layer(s) (the first and second adhesive layers) may be formed with various adhesives, for example, a vinyl acetate-series adhesive, an acrylic adhesive, a polyester-series adhesive, a urethane-series adhesive, and an epoxy-series adhesive. As used in this description and claims, the term "adhesive" is synonymous with the term "pressure sensitive adhesive". The adhesive may be a solution adhesive or a hot-melt adhesive. A preferred adhesive layer is formed with a urethane-series adhesive. The urethane-series adhesive may be a one-component (or one-pot) adhesive (or pressure sensitive adhesive) containing a polyurethane resin or may be a two-component (or two-pot) curable adhesive (reactively curable adhesive or pressure sensitive adhesive) containing an isocyanate component and a diol component (or a prepolymer component).

The adhesive layer has a thickness selectable from the range of, for example, about 0.1 to 50 µm, and may usually have a thickness of about 1 to 30 µm, preferably about 3 to 25 µm, and more preferably about 5 to 20 µm (e.g., about 5 to 15 µm).

For the above-mentioned resin layers, the resin layer adjacent to the lens body (the first thermoplastic resin layer) can be used for bonding or joining to the lens body, the resin layer forming the outermost layer of the laminate (the second thermoplastic resin layer) can be functionalized as a protective layer for the optically functional layer. Thus the resin layers may comprise any of various thermoplastic resins or curable resins according to the purpose. The thermoplastic resins may include various transparent resins, for example, a cellulose acylate (e.g., a cellulose acetate such as a cellulose diacetate or a cellulose triacetate, and a cellulose acetate $C_{3-6}$acylate such as a cellulose acetate propionate or a cellulose acetate butyrate), a non-cellulose resin (e.g., a polycarbonate resin, a polyamide resin, a polyester resin, a cyclic olefin resin, an acrylic resin, and a urethane resin). The non-cellulose resin may be a resin corresponding to the thermoplastic resin as exemplified in the paragraph of the lens body. The curable resins (thermosetting or photo-curable resins) may include, for example, an epoxy resin, a silicone resin, and a curable resin containing a polyfunctional (meth)acrylate. Among these resins, a thermoplastic resin is practically used in a case where the laminate is inserted in a mold and the lens body is then formed on the laminate by injection molding. These resins, which may be used alone or in combination, can be selected according to the function of the resin layer. For example, the first thermoplastic resin layer may comprise a polyamide resin (e.g., the alicyclic polyamide resin described above), and the second thermoplastic resin layer may comprise a polyamide resin (e.g., the alicyclic polyamide resin described above) or a cellulose acylate (e.g., a cellulose acetate).

Each resin layer may have a thickness of, for example, about 10 to 500 µm (e.g., about 30 to 400 µm), preferably about 50 to 300 µm (e.g., about 75 to 270 µm), and more preferably about 100 to 250 µm (e.g., about 150 to 250 µm).

In order to make the bonding strength between the first resin layer and the lens body larger than the adhesive strength between the optically functional layer and the adhesive layer, it is desired that the first resin layer and the lens body be tightly bonded by melt-bonding. That is, the bonding strength between the first resin layer and the lens body is usually larger than the adhesive strength between the first resin layer and the first adhesive layer.

The functional lens may have a hardcoat layer formed on a front face thereof (the surface of the laminate) and may have an anti-reflection layer, a defogging layer, or other layers on a rear face thereof (the surface of the lens body).

The functional glasses of the present invention comprise the functional lenses (such as polarizing lenses) and a frame to which the functional lenses are fitted. The functional glasses usually have a frame including earpieces (or temples).

The frame may be composed of, for example, a metal (such as titanium, a nickel alloy, or magnesium) or a resin. The frame usually has a groove in an internal circumferential surface thereof. The resin may include, for example, a cellulose-series resin (for example, a celluloid; a cellulose acylate, e.g., a cellulose acetate such as a cellulose diacetate or a cellulose triacetate, and a cellulose acetate $C_{3-6}$acylate such as a cellulose acetate propionate or a cellulose acetate butyrate), a polyamide resin, a polycarbonate-series resin, a polyethersulfone resin, and a polyetherimide resin. The frame may optionally be composed of a natural material such as tortoiseshell. The frame is usually composed of a cellulose acylate or a polyamide resin. The frame has an area for fitting or holding (or supporting) the lens, and may be a full rim frame that can completely enclose the lens.

EXAMPLES

The following examples are intended to describe this invention in further detail and should by no means be interpreted as defining the scope of the invention.

Example 1

A polyamide ("Torogamid CX7323" manufactured by Daicel-Evonik Ltd.) for each of a first resin layer, a second resin layer, and a lens body resin, a two-component urethane-series resin adhesive ("TM-595" manufactured by Toyo-Morton, Ltd.) for a first adhesive layer, a two-component urethane-series resin adhesive ("CAT-85" manufactured by Toyo-Morton, Ltd.) for a second adhesive layer, and a poly(vinyl alcohol) polarizing film as an optically functional layer were used to produce a lens. The edge face of the lens was shaped into the form shown in FIG. 1. Each of the first resin layer and the second resin layer has a thickness of 200 μm, the lens has a thickness of 2.5 mm, and the poly(vinyl alcohol) polarizing film has a thickness of 40 μm. A first inclined wall 8 has an angle θ1 of 30°, and a second inclined wall 9 has an angle θ2 of 30°.

A nylon or polyamide resin ("Grilamid TR90" EMS-Chemie Holding AG) was grooved (width: 2 mm, depth: 1 mm) to give a frame.

In a fitting test, the lens was fitted in the groove of the frame heated to 80° C. from a fitting side, and then the lens was removed once to observe the separation (or delamination) of the layers in the lens. If no separation was observed, the frame was heated again, and the fitting and removal of the lens were repeated until the separation of the layers was observed. After the fitting test was repeated 50 times, the lens had no separation of the layers at the edge face of the lens.

Examples 2 to 4

In the same manner as Example 1 except that the frame material was a nickel alloy (Example 2), titanium (Example 3), or a triacetyl cellulose (Example 4), each frame was examined for the number of fitting operations repeated until the separation of the layers was observed. The results show that the separation of the layers at the edge face of the lens was observed at the number of fitting operations of 30 times for the nickel alloy frame (Example 2), 35 times for the titanium frame (Example 3), and 25 times for the triacetyl cellulose frame (Example 4). In the following Examples, the triacetyl cellulose frame is simply referred to as a cellulose frame.

Examples 5 to 8

In the same manner as Examples 1 to 4 except that the edge face of the lens was shaped into the form shown in FIG. 2 (the angle θ1 of first inclined wall 18: 25°, the angle θ2 of second inclined wall 19: 25°), each frame was examined for the number of fitting operations repeated until the separation of the layers was observed. For all of these frames, after the fitting operation was repeated 50 times, the lens had no separation of the layers at the edge face of the lens.

Examples 9 to 12

In the same manner as Examples 1 to 4 except that the edge face of the lens was shaped into the curved form shown in FIG. 3, each frame was examined for the number of fitting operations repeated until the separation of the layers was observed. For all of these frames, after the fitting operation was repeated 50 times, the lens had no separation of the layers at the edge face of the lens.

Examples 13 to 16

In the same manner as Examples 1 to 4 except that the edge face of the lens was shaped into the form shown in FIG. 4 (the angle θ1 of first inclined wall 8: 20°, the angle θ2 of second inclined wall (vertical wall) 39: 0°), each frame was examined for the number of fitting operations repeated until the separation of the layers was observed. The results show that the separation of the layers was observed at the edge face of the lens at the number of fitting operations of 48 times for the nylon frame (Example 13), 45 times for the nickel alloy frame (Example 14), 46 times for the titanium frame (Example 15), and 40 times for the cellulose frame (Example 16).

For Example 15, a bisphenol A-based polycarbonate resin PC ("LCS3400" manufactured by Mitsubishi Plastics, Inc.) was used as the second resin layer.

Examples 17 to 20

In the same manner as Examples 1 to 4 except that the edge face of the lens was shaped into the form shown in FIG. 5 (the angle θ1 of first inclined wall 8: 15°, the angle θ2 of second inclined wall 9: 30°), each frame was examined for the number of fitting operations repeated until the separation of the layers was observed. For all of these frames, after the fitting operation was repeated 50 times, the lens had no separation of the layers at the edge face of the lens.

Comparative Examples 1 to 4

In the same manner as Examples 1 to 4 except that the edge face of the lens was shaped into the form shown in FIG. 6 (the angle θ1 of first inclined wall 48: 25°, the angle θ2 of second inclined wall 49: 25°), each frame was examined for the number of fitting operations repeated until the separation of the layers was observed. The results show that the separation of the layers was observed at the edge face of the lens at the number of fitting operations of 3 times for the nylon frame (Comparative Example 1), twice for the nickel alloy frame (Comparative Example 2), 3 times for the titanium frame (Comparative Example 3), and once for the cellulose frame (Comparative Example 4).

The results are shown in Table 1.

TABLE 1

| | Composition of lens | Edge face of lens | Frame material | Number of fitting operations repeated until separation |
|---|---|---|---|---|
| Example 1 | PA/PVA/PA | FIG. 1 | Nylon | >50 |
| Example 2 | PA/PVA/PA | FIG. 1 | Nickel alloy | 30 |
| Example 3 | PA/PVA/PA | FIG. 1 | Titanium | 35 |
| Example 4 | PA/PVA/PA | FIG. 1 | Cellulose | 25 |
| Example 5 | PA/PVA/PA | FIG. 2 | Nylon | >50 |
| Example 6 | PA/PVA/PA | FIG. 2 | Nickel alloy | >50 |
| Example 7 | PA/PVA/PA | FIG. 2 | Titanium | >50 |
| Example 8 | PA/PVA/PA | FIG. 2 | Cellulose | >50 |
| Example 9 | PA/PVA/PA | FIG. 3 | Nylon | >50 |
| Example 10 | PA/PVA/PA | FIG. 3 | Nickel alloy | >50 |
| Example 11 | PA/PVA/PA | FIG. 3 | Titanium | >50 |
| Example 12 | PA/PVA/PA | FIG. 3 | Cellulose | >50 |
| Example 13 | PA/PVA/PA | FIG. 4 | Nylon | 48 |
| Example 14 | PA/PVA/PA | FIG. 4 | Nickel alloy | 45 |
| Example 15 | PA/PVA/PC | FIG. 4 | Titanium | 46 |
| Example 16 | PA/PVA/PA | FIG. 4 | Cellulose | 40 |
| Example 17 | PA/PVA/PA | FIG. 5 | Nylon | >50 |
| Example 18 | PA/PVA/PA | FIG. 5 | Nickel alloy | >50 |
| Example 19 | PA/PVA/PA | FIG. 5 | Titanium | >50 |
| Example 20 | PA/PVA/PA | FIG. 5 | Cellulose | >50 |
| Comparative Example 1 | PA/PVA/PA | FIG. 6 | Nylon | 3 |
| Comparative Example 2 | PA/PVA/PA | FIG. 6 | Nickel alloy | 2 |
| Comparative Example 3 | PA/PVA/PA | FIG. 6 | Titanium | 3 |

TABLE 1-continued

| | Composition of lens | Edge face of lens | Frame material | Number of fitting operations repeated until separation |
|---|---|---|---|---|
| Comparative Example 4 | PA/PVA/PA | FIG. 6 | Cellulose | 1 |

As apparent from Table 1, the number of fitting operations repeated until the separation was observed in the fitting test is larger in Examples than in Comparative Examples. Thus, these results clearly show that undesirable separation (delamination) in the fitting operation of the lens hardly appears.

INDUSTRIAL APPLICABILITY

The functional lenses of the present invention are fitted to a frame to preferably form functional glasses, for example, corrective glasses (such as prescription glasses for correcting farsightedness and/or nearsightedness, or glasses for correcting astigmatism) and stereoscopic vision glasses (3D glasses). The functional glasses may be polarizing glasses or sunglasses.

REFERENCE SIGNS LIST 1, 11 . . . Lens body
2, 12 . . . Laminate
3, 13 . . . First thermoplastic resin layer
4, 14 . . . First adhesive layer
5, 15 . . . Polarizing film
6, 16 . . . Second adhesive layer
7, 17 . . . Second thermoplastic resin layer
8, 18, 28, 48 . . . First inclined wall
9, 19, 29, 49 . . . Second inclined wall
39 . . . Vertical wall
10, 20, 30, 40, 50 . . . Peak

The invention claimed is:

1. A functional lens for being fitted in a groove of a frame, the lens comprising, in sequence directly or indirectly:
a lens body,
a first thermoplastic resin layer bonded to the lens body,
an adhesive layer, and
an optically functional layer,
wherein the lens has an edge face to the groove, the edge face has a shape with a peak positioned at a fitting side relative to the adhesive layer in a thickness direction of the lens.

2. The functional lens for being fitted in a groove of a frame according to claim 1, which comprises, in sequence:
the lens body, and
a laminate containing the optically functional layer;
wherein the laminate comprises:
the first thermoplastic resin layer bonded to the lens body, and
a first adhesive layer between the first thermoplastic resin layer and the optically functional layer; and
the edge face to the groove has the shape having with the peak in the thickness direction, and the peak is positioned at or near the first thermoplastic resin layer relative to the first adhesive layer.

3. The functional lens according to claim 1, wherein the lens has a first face on a near side of a fitting portion for being fitted in the groove of the frame and a second face, at least the fitting portion has an edge face having a guide portion which is inclined or curved outward in a direction from the first face of the lens toward the second face of the lens.

4. The functional lens according to claim 1, wherein the lens has at least a fitting portion for being fitted in the groove of the frame, the fitting portion has an edge face having a linearly bent mountain shape or a curved mountain shape.

5. The functional lens according to claim 1, which has a laminate comprising, in sequence:
the first thermoplastic resin layer,
a first adhesive layer,
the optically functional layer,
a second adhesive layer, and
a second thermoplastic resin layer,
wherein the first thermoplastic resin layer is melt-bonded to the lens body.

6. The functional lens according to claim 5, which is a functional lens for being fitted to a metallic or resin frame;
wherein the optically functional layer comprises at least one functional layer selected from the group consisting of a polarizing layer, an anti-glare layer, a light-control layer, an anti-reflection layer, and a coloring layer;
the first thermoplastic resin layer and the second thermoplastic resin layer each independently comprise at least one transparent resin selected from the group consisting of a cellulose acylate, a polycarbonate resin, a polyamide resin, a polyester resin, a cyclic olefin resin, an acrylic resin, and a urethane resin;
the first adhesive layer and the second adhesive layer each comprise a urethane-series adhesive; and
the lens body comprises at least one transparent resin selected from the group consisting of a polycarbonate resin, a polyamide resin, a polyester resin, a cyclic olefin resin, an acrylic resin, and a urethane resin.

7. The functional lens according to claim 5, wherein the first thermoplastic resin layer comprises a polyamide resin, and the second thermoplastic resin layer comprises a polyamide resin or a cellulose acylate.

8. The functional lens according to claim 1, which comprises the lens body and a polarizing protective laminate, wherein the polarizing protective laminate comprises, in sequence:
the first thermoplastic resin layer on a surface of the lens body,
a first adhesive layer,
a polarizing film,
a second adhesive layer, and
a second thermoplastic resin layer.

9. The functional lens according to claim 1, wherein the lens body comprises a polyamide resin having an aliphatic hydrocarbon ring.

10. The pair of functional glasses comprising:
a functional lens recited in claim 1 and
a frame to which the functional lens is fitted.

11. The pair of functional glasses according to claim 10, which is a pair of corrective glasses.

12. The pair of functional glasses according to claim 10, which is a pair of polarizing glasses or a pair of sunglasses.

13. A process for producing a functional lens for being fitted in a groove of a frame, the lens comprising, in sequence directly or indirectly:
a lens body,
a first thermoplastic resin layer bonded to the lens body,
an adhesive layer, and
an optically functional layer,
wherein the process comprises cutting an edge face, to be fitted to the groove, into a shape having a peak positioned at a fitting side relative to the adhesive layer in a thickness direction of the lens.

* * * * *